United States Patent [19]

Douchy

[11] Patent Number: 4,708,897
[45] Date of Patent: Nov. 24, 1987

[54] COMPOSITE PRODUCT HAVING A TUBULAR METAL CASING WITH A WELT-TYPE SEAM, AND A CORE IN POWDER FORM, WHICH CAN BE ROLLED UP

[75] Inventor: Michel Douchy, Vertain, France

[73] Assignee: Vallourec, France

[21] Appl. No.: 583,815

[22] Filed: Feb. 27, 1984

[30] Foreign Application Priority Data

Mar. 3, 1983 [FR] France ................. 83 03967

[51] Int. Cl.⁴ .................. B32B 33/00; C22B 9/10
[52] U.S. Cl. ..................... 428/36; 72/137; 72/146; 72/365; 72/367; 174/102 R; 174/102 P; 219/145.22; 228/128; 228/129
[58] Field of Search ............. 428/36, 167, 75, 76; 406/196, 159, 166; 72/135, 137, 146, 127, 369, 371, 379, 365, 367; 228/129, 128, 126; 174/102 R, 102 P, 102 D, 102 SP; 219/145.22, 146.31, 145.1, 146.1

[56] References Cited

U.S. PATENT DOCUMENTS

| | | | |
|---|---|---|---|
| 1,588,761 | 6/1926 | Ligot | 219/145.22 |
| 1,629,748 | 5/1927 | Stoody | 219/145.22 |
| 2,576,698 | 11/1951 | Russum | 428/75 |
| 2,892,007 | 6/1959 | Rickards et al. | 174/102 R |
| 3,474,518 | 10/1969 | Strandell | 219/145.22 |
| 4,012,621 | 3/1977 | Uchida et al. | 219/145.22 |
| 4,220,031 | 9/1980 | Naslund | 72/379 |
| 4,364,770 | 12/1982 | Douchy et al. | 75/53 |

FOREIGN PATENT DOCUMENTS

| | | | |
|---|---|---|---|
| 1046954 | 12/1953 | France | 174/102 R |
| 71406 | 12/1946 | Norway | 174/102 D |
| 617577 | 2/1949 | United Kingdom | 174/102 D |

Primary Examiner—John E. Kittle
Attorney, Agent, or Firm—Jones, Day, Reavis & Pogue

[57] ABSTRACT

The invention concerns a composite product, also referred to as cored wire, comprising a tubular metal casing having a welt-type seam, containing a core of compacted powder or granular material, which can be easily rolled up and then unrolled, without the risk of the seam coming undone. The composite product according to the invention comprises, on the outside wall of the casing and straddling the seam region, hollow impressed portions which are produced by cold deformation of the metal. These portions are in the form of grooves which are elongate transversely with respect to the axis of the composite product. The composite product according to the invention is used, in particular, for treating metal baths.

9 Claims, 4 Drawing Figures

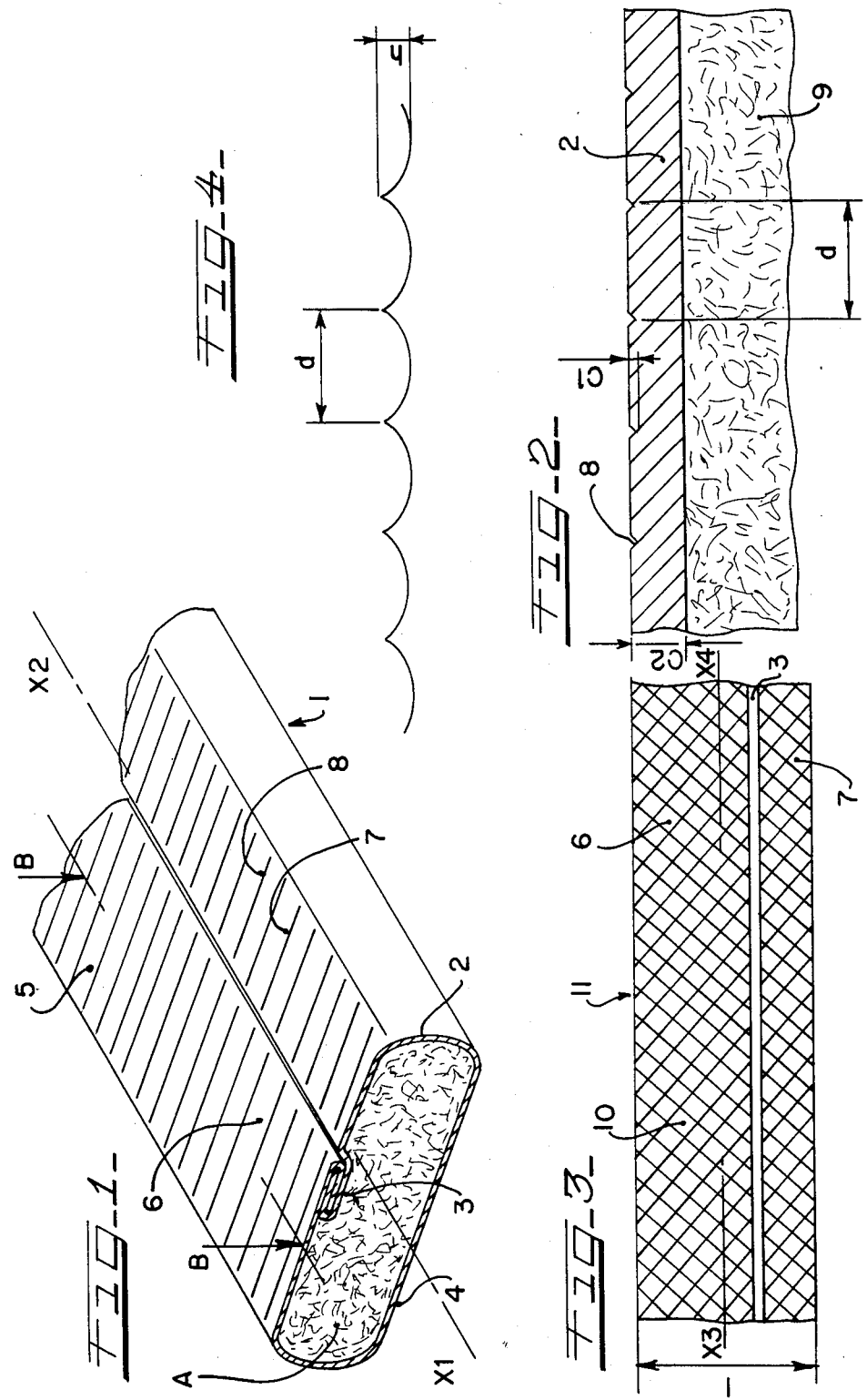

COMPOSITE PRODUCT HAVING A TUBULAR METAL CASING WITH A WELT-TYPE SEAM, AND A CORE IN POWDER FORM, WHICH CAN BE ROLLED UP

The invention concerns a composite product having a tubular metal casing with a welt-type or clasped seam, containing a core portion of compacted powder or granular material, which product can be easily rolled up, for example onto a drum, then unrolled and straightened.

Composite tubular products which are often referred to as "cored wire" are used primarily for treating liquid metal baths but also for welding and for still other uses. Thus, French patent application No. 2 476 542 describes such a product, the casing of which is closed by a welt-type or clasp-type seam along a generating line thereof, the casing having two parallel flattened portions and containing a compacted powder or granular material. That product can be wound onto a drum and then unwound and dressed or straightened so as to be introduced into a liquid metal bath or into any other reaction space.

Experience has shown however that, depending on the characteristics of the metal strip which forms the casing of the product, the conditions of forming the welt-type seam and also the conditions under which the composite product is rolled up, deformation of the casing along the seam region may be found when the composite product is unrolled.

That deformation results in the fold portions which are formed in the operation of producing the welt-type or clasp seam suffering from more or less localized loosening, and may even go as far as to cause the fold portions forming the seam to become unhooked from each other.

Research was therefore carried out into the possibility of avoiding the danger of the seam becoming undone in the course of the operations of rolling up and unrolling the tubular composite product, without adversely affecting the capability of the product for being dressed or straightened after it has been unrolled.

The composite product according to the invention comprises a tubular metal casing which is formed from a strip which is joined by a welt-type seam along a generatrix, within which is disposed at least one compacted powder or granular material. On its outside wall, and straddling the seam region, the casing has hollow impressed portions which are formed by cold deformation of the metal, in the form of grooves that are elongate transversely with respect to the axis of the product, the depth thereof not exceeding 60% of the thickness of the casing. Preferably, the impressed portions are so oriented that their mean direction is at an angle of 45° to 135° with respect to said axis.

Preferably, the composite product comprises two flattened portions, with the seam region being disposed within one of the two flattened portions.

Preferably also, the mean distance "d" between succesive impressed portions, as measured along the axis of a generatrix, is less than a third of the distance between the two flattened portions of the composite product.

Finally, a ductile metal such as a mild steel which has or has not been cold-worked, is advantageously used to form the casing of the composite product according to the invention.

The invention also concerns a process for producing the composite product according to the invention, wherein the impressed portions are formed by rolling a roller over the outside surface of the casing, straddling the seam region, under a sufficient pressure, the roller having teeth, the tips of which are impressed into the wall of the casing.

Finally, the invention also concerns a use of the composite product according to the invention, which comprises storing it by rolling it onto a drum, the composite product being so oriented that the seam region is outward, the composite product then being unrolled and possibly dressed or straightened for it to be introduced into a reaction space.

The drawings, description and examples set out hereinafter will permit the characteristics of the composite product according to the invention and uses thereof to be better appreciated, without limitation thereon.

FIG. 1 shows a perspective view of a portion of the composite product according the invention, FIG. 2 shows a view on an enlarged scale in partial longitudinal section along the line B—B perpendicular to the plane of the upper face (5) of the composite product shown in FIG. 1, and parallel to the axis X1 X2 of that product, FIG. 3 shows a plan view from above of an alternative embodiment of the composite product according to the invention, and FIG. 4 shows a sectional view of the development of a tooth structure provided on the periphery of a roller used for producing the composite product shown in FIG. 1.

The composite product 1, which is also referred to as cored wire, as illustrated in FIG. 1, comprises a tubular metal casing 2 enclosing a core made of a material in compacted granular or powder form, as can be seen at A, in a cross-sectional plane perpendicular to the axis X1 X2 of the composite product. The tubular casing 2 is closed by a welt-type or clasp seam at 3, along a generatrix.

The cross section of the cored wire is close to that of a rectangle and is formed by two parallel, oppositely disposed flattened portions: the lower portion of which only the edge 4 can be seen and the upper portion 5 which are connected by two more or less rounded short sides. The clasp or welt seam 3 is positioned on the upper flattened face 5. In the seam region and on respective sides thereof, at locations 6, 7, impressed portions 8 are impressed in the upper face 5 by cold displacement of the metal. The impressed portions 8 are in the form of substantially straight grooves which are disposed parallel to each other, at regular spacings. Forming those grooves causes substantial cold working of the metal along the grooves.

FIG. 2 provides a precise notion of the permanent deformation imposed on the metal along the grooves such as indicated at 8, which are impressed into the thickness of the casing 2 which encloses the material constituting the core 9. The depth of the grooves "c1" is preferably from 10 to 60% of the thickness "c2" of the casing. The section of the grooves 8, which in the illustrated embodiment is triangular, may be of various shapes, the aim being to create localized stresses, which are as high as possible, in the metal.

The grooves are impressed into the metal by any suitable means after the operations of forming the seam and shaping and compacting the cored wire, and before the composite product is rolled onto a drum or spool.

The grooves may for example be formed by rollers which are mounted on the cored wire production line, after the compacting operation and before the rolling operation. The working surface of the rollers, the general shape of which is adapted to the general shape of the wire to be produced, comprises regularly distributed teeth, the successive tips of which form the grooves according to the invention, by a pressure effect, in the outside surface of the casing, straddling the seam region.

FIG. 4 is a diagrammatic view of part of the development of the tooth configuration of a roller which is used for producing the sheathed wire shown in FIG. 1. The height h is markedly greater than the depth e1 of the grooves to be produced. The distance "d" between grooves is less than a third of the distance between the two flattened portions of the cored wire.

FIG. 3 which is a plan view of the upper region 10 of a portion of cored wire 11 illustrates an alternative embodiment of the invention. In this case, the impressions are produced in the form of two arrays of close parallel grooves at regular spacings, the grooves of the first array being disposed substantially at 45° with respect to the axis X3 X4 of the cored wire and the grooves of the second array crossing those of the first array and being disposed substantially at 135° with respect to the above-mentioned axis. It will be seen that the grooves extend on respective sides of the seam region 3 at 6 and 7 virtually over the entire surface of the upper portion 10 of the product 11.

Other embodiments may be envisaged, with no obligation for the grooves to be straight and/or parallel. The length of the grooves may also be limited so as to be less than the width "l" of the cored wire.

The density of the grooves, that is to say, the distance d which separates the grooves, is to be fairly small with respect to the thickness of the wire and preferably less than a third of said thickness, as measured between flattened portions thereof.

The base metal forming the casing is preferably a ductile metal which has been only slightly or not cold worked, such as a mild steel in the tempered condition, which has not suffered substantial and generalized cold deformation such as rolling or drawing.

It is found that the composite product according to the invention may be rolled up to form a spool and then unrolled and dressed or straightened without the seam region suffering from localized deformation or without the danger of the welt-type seam coming open. In particular, the cored wire can be rolled up on the flat faces 4 and 5 thereof, with the upper face on which the seam is formed being directed outwardly of the coil.

EXAMPLE

The process described with reference to FIG. 1 was applied to the production of sheathed wire having the following characteristics:

section of the wire: 26×9 mm
nature of the compacted powder: silico-calcium containing 30% of Ca
casing:
   mild steel
   thickness (c2) 0.4 mm
impressed portions:
   parallel grooves perpendicular to the axis of the wire, spaced at 1.5 mm
   depth (c1) of impressed portions 0.15 mm shaping roller:
   d=1.5 mm
   h=0.4 mm That cored wire was used as a treatment wire in a liquid steel bath ladle.

The same process was used for similar wires, with a section of 16×7 mm.

The composite product according to the invention may be put to widely varying uses and is not limited to use as a wire for treating metal baths.

Although the invention has been described in a particular case, it is in no way limited and will be applied whenever the claimed principles are employed.

I claim:

1. In a composite product comprising a tubular metal casing (2) and at least one compacted powder or granular material (A) contained within the casing, said casing being formed from a strip joined by a welt-type seam (3) along a generatrix, the improvement wherein said casing has hollow impressed portions on its outside wall, straddling the seam region, said impressed portions being formed by cold deformation of the metal in the form of grooves which are elongate transversely with respect to the axis of the product, the depth of said impressed portions not exceeding 60% of the thickness of the casing, whereby said impressed portions prevent deformation and unhooking of the seam.

2. A composite product according to claim 1 characterised in that the impressed portions (8) are oriented in a direction which is at an angle of from 45° to 135° with respect to the axis of the composite product.

3. A composite product according to claim 1 or claim 2 characterised in that the cross section thereof has at least two mutually oppositely disposed flattened portions (4, 5), the seam region (3) being disposed within one of said two flattened portions.

4. A composite product according to claim 3 characterised in that the mean distance "d" between successive impressed portions as measured along the axis of a generatrix is less than a third of the distance between the two flattened portions of the composite product.

5. A composite product according to claim 1 characterised in that the metal forming the external casing is slightly cold worked or not cold worked.

6. A composite product according to claim 1 characterised in that the external casing is of mild steel.

7. A composite product according to claim 1 characterised in that the impressed portions are formed by two arrays of parallel crossed grooves.

8. Use of the composite product according to claim 1 characterised in that it is rolled onto a drum in such a way that the seam region is oriented outwardly, the composite product then being unrolled and possibly straightened before being introduced into a reaction space.

9. A process for producing a composite product comprising a tubular metal casing formed from a strip having a welt-type seam along a generatrix, within which is housed at least one compacted powder or granular material, which is capable of being rolled up on a drum and unrolled, characterised in that hollow impressed portions which are elongate transversely are produced on the outside surface of the casing by rolling a roller over said surface, straddling the seam region, with a sufficient pressure, the roller comprising teeth whose tips are impressed into the wall of the casing.

* * * * *